United States Patent [19]

Parvulescu et al.

[11] Patent Number: 5,821,874
[45] Date of Patent: Oct. 13, 1998

[54] MESSAGING TERMINAL WITH VOICE NOTIFICATION

[75] Inventors: Adrian Parvulescu, Fish's Eddy, N.Y.; Andrew Todd Zidel, Hawthorne, N.J.

[73] Assignees: Sony Corporation, Tokyo, Japan; Sony Electronics Inc., Park Ridge, N.J.

[21] Appl. No.: 618,162

[22] Filed: Mar. 19, 1996

[51] Int. Cl.⁶ .................................................. H04Q 7/04
[52] U.S. Cl. .............................. 340/825.44; 340/825.47; 340/825.52; 455/412; 455/418; 455/563; 455/413; 379/68; 379/69; 379/70; 379/93.01; 379/93.26; 379/93.28
[58] Field of Search ...................... 340/825.44, 825.47, 340/825.52, 825.48; 369/1, 2, 6–8; 455/412, 418, 563, 413, 415; 379/88, 67, 68–70, 93.01, 93.26, 93.28, 93.24

[56] References Cited

U.S. PATENT DOCUMENTS

| | | | |
|---|---|---|---|
| 4,330,780 | 5/1982 | Masaki | 340/825.44 |
| 4,385,295 | 5/1983 | Willard et al. | 340/825.44 |
| 4,412,217 | 10/1983 | Willard et al. | 340/825.44 |
| 4,677,657 | 6/1987 | Nagata et al. | 379/63 |
| 4,868,560 | 9/1989 | Oliwa et al. | 340/825.44 |
| 5,058,150 | 10/1991 | Kang | 379/58 |
| 5,153,579 | 10/1992 | Fisch et al. | 340/825.22 |
| 5,307,059 | 4/1994 | Connary et al. | 340/825.44 |
| 5,459,458 | 10/1995 | Richardson et al. | 340/825.52 |
| 5,583,921 | 12/1996 | Hidaka | 379/93 |
| 5,654,942 | 8/1997 | Akahane | 369/2 |

OTHER PUBLICATIONS

"Journal of the Electronics Industry", Feb. 1996, Panasonic, *The G400–much more than a mobile phone*. 1 page adver., USA.

"Mobile Office", Feb. 1996, *Two Way Paging Enables Meaningful Comm.*, Sky Tel Corp.Wash. DC, USA, pg. 18.

"Telecom Sources", Oct. 1995, *Value–loaded pagers, low prices create buyer's market*, pp., 110–158. USA.

*Primary Examiner*—Michael Horabik
*Assistant Examiner*—Yonel Beaulieu
*Attorney, Agent, or Firm*—Lise A. Rode; Jerry A. Miller

[57] ABSTRACT

A method for receiving and processing an incoming message in a wireless messaging terminal. The method includes providing a receiver which receives the message and a memory for storing the message. The method further includes matching the message with a pre-recorded voice prompt stored in the memory and retrieving the voice prompt from the memory. In addition, the method includes playing the voice prompt as an audible alert signal through an audio output device.

9 Claims, 3 Drawing Sheets

000000# MESSAGING TERMINAL WITH VOICE NOTIFICATION

CROSS REFERENCE TO RELATED DOCUMENTS

This invention is related to U.S. application Ser. No. 08/577,797, filed Dec. 22, 1995 which is hereby incorporated by reference.

FIELD OF THE INVENTION

This invention relates to the field of pocket sized messaging terminals such as pagers which can be used to communicate with individuals who might otherwise be inaccessible.

BACKGROUND OF THE INVENTION

A pager is a portable device which enables its user to receive a message from a central location. Upon reception of a message such devices typically vibrate or emanate a beeping sound, hence pagers are often referred to as beepers. In the past, pagers were primarily used by businesses as a means to communicate with their personnel, who were inaccessible by means of a telephone. However, times have changed and so have the users of such devices. Pagers are now being utilized by a varied group ranging from doctors, engineers and lawyers to parents and school children.

Over the years, there has been a major thrust by various manufacturers to design pagers that are more personalized, in order suit the personality of each individual user and thus to increase marketability of their products. Such efforts range from more compact packaging to a wider selection of colors. These changes have been well received by consumers. However, despite all efforts made to personalize these devices, the pager is still an impersonal piece of electronic gadgetry.

Even though today's pager is capable of receiving, storing, displaying and in some cases transmitting a response to a received message, when it comes to alerting the user of reception of a new message, the choice is still either use of a beeping tone or a vibration, in cases where silence is required.

SUMMARY OF THE INVENTION

The present invention relates to a pager (either receive only or two way) or a similar device that is more user friendly than other pagers currently developed. As well as being able to receive messages and, in the preferred embodiment, transmit responses, present invention is also capable of alerting the user of reception of an incoming message by use of a voice alert, through an audio output means. This voice alert may be pre-recorded at the time of manufacture or even recorded by the user himself/herself with the aid of an audio input device, such as a microphone. The voice alert stored does not even have to be a voice, as it could be any sound that could be sampled. This capability transforms the pager to one that has the creativity of the user in mind. For example, a mother may record her voice on her child's pager, saying "here is a message from mom" so when she pages the child the child will hear his mother's voice saying "here is a message from mom", so the child knows who has sent him the message without having to actually read it or to play it back.

In the preferred embodiment, this invention relates to a wireless, two way messaging terminal. Such messaging terminals are currently commercially available. The present messaging terminal is preferably about the same size as such commercially available messaging terminals. In addition to receiving messages, this invention is capable of emitting either a factory set or user recorded audible alert to notify its user of an incoming message. Furthermore, the user will have the capability of recording and transmitting an audio response. For purposes of this document, such devices, whether one way or two way, will be referred to herein as "wireless messaging terminals".

It is an object of an embodiment of this invention to provide a messaging terminal which alerts users to the presence of a message by playing a stored voice prompt as an alert signal.

It is an object of an embodiment of the present invention to make a wireless messaging terminal which is capable of receiving messages and prompting its user of the arrival of a message by generating an audible signal.

It is another object of the present invention to make a wireless messaging terminal that is capable of receiving and transmitting digital messages.

It is a further object of the present invention to make a wireless messaging terminal that is capable of recording and playing an audio signal.

It is a further object of this invention to make a wireless messaging terminal that is capable of storing and retrieving an audio signal.

These and other objects, advantages and features of the invention will become apparent to those skilled in the art upon consideration of the following description of the invention.

According to one aspect of this invention a wireless messaging terminal capable of receiving and transmitting messages is provided. Upon receiving a message, the sender's I.D. number will be compared to user's phone book, and if a mach is found the corresponding personalized voice prompt will be played through a speaker. If there is no match, a generic voice prompt such as "You have a new message" will be played.

The features of the invention believed to be novel are set forth with particularity in the appended claims. The invention itself however, both as to organization and method of operation, together with further objects and advantages thereof, may be best understood by references to the following description taken in conjunction with the accompanying drawings.

DETAILED DESCRIPTION OF THE INVENTION

Figure 1:
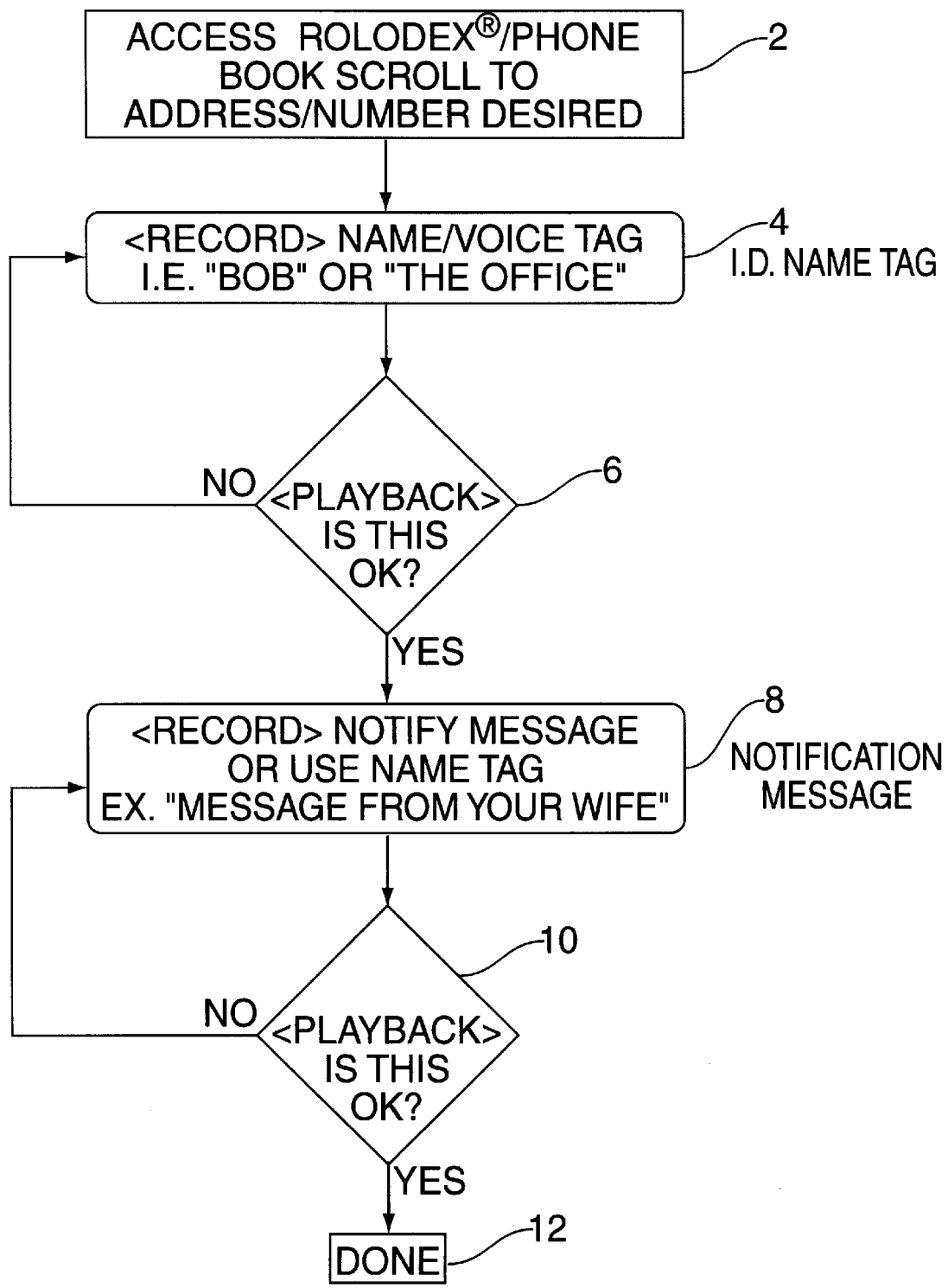
FIG. 1 is a flowchart of the creation of I.D. name tag and notification message process used to create a personalized message.

FIG. 1 shows a flowchart of the process used to create personalized messages for I.D. name tags and notification messages. In operations box 2 the user can select a number, such as a telephone number accessed via an electronic phone book such as a Rolodex® type database stored within the messaging terminal and go to operations box 4 where he can record his personalized audio signal (I.D. name tag) using his voice. The record function may be accomplished by digitizing and encoding the audio signal and then storing the encoded signal in memory. Using decisions box 6, the operator can choose to playback the recorded audio signal. The audio signal is played back by retrieving it from memory, decoding it, converting the decoded signal to analog and applying the analog signal to a transducer. If the playback audio does not meet the satisfaction of the user, he is given the choice to go back to operations box 4 and repeat the recording process. Otherwise the operator is directed to operations box 8 where he can proceed to record a notification message, for example "message from wife". In decision box 10 the operator can choose to select the message recorded in operations box 8 or to go back and re-record. Upon satisfactory recording of the notification message the process takes us to operations box 12 and thus the creation of personalized messages is complete. The preceding allows the user to scroll through the stored phone book until he hears the name of a recipient such as "Bob" or "The Office". This negates the need to look at the liquid crystal display. Additionally, the use of Notification Message enables the user of this invention of knowing who the sender is, again by using an audible tone as opposed to the user having to look at the liquid crystal display.

Figure 2:
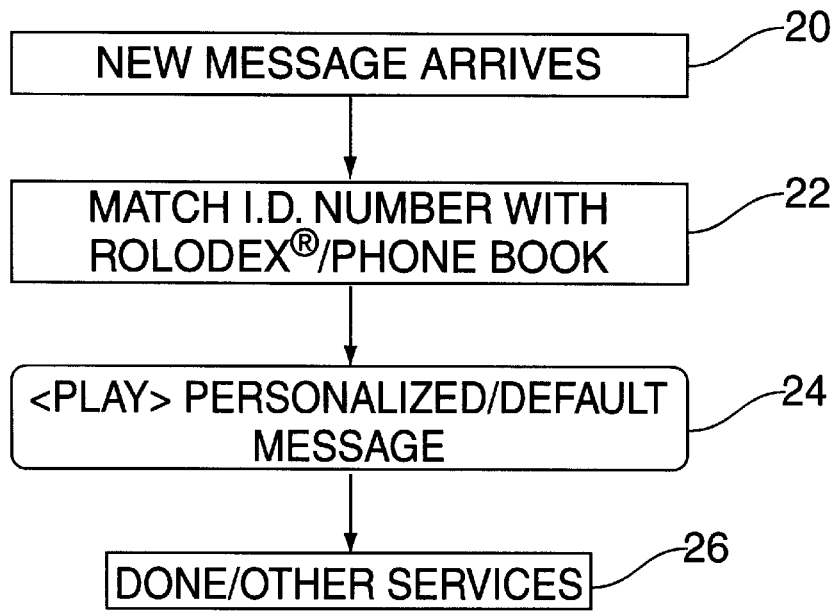
FIG. 2 is a flowchart of the Voice Notification of Message Reception process used to playback either a personalized or a default message.

FIG. 2, is the flowchart of Voice Notification of Message Reception. This flowchart briefly explains the sequence from message arrival to playback of either personalized or default message. Upon arrival of message in operations box 20, the I.D. number is matched with the I.D. number in the phone book which has an I.D. Name Tag associated with it in operations box 22 and passed to operations box 24, where the selected message is played back. The message is played back using the same process described above. Upon successful completion of message playback the process takes us to operations box 26 which completes this process and takes us to other services.

Figure 3:
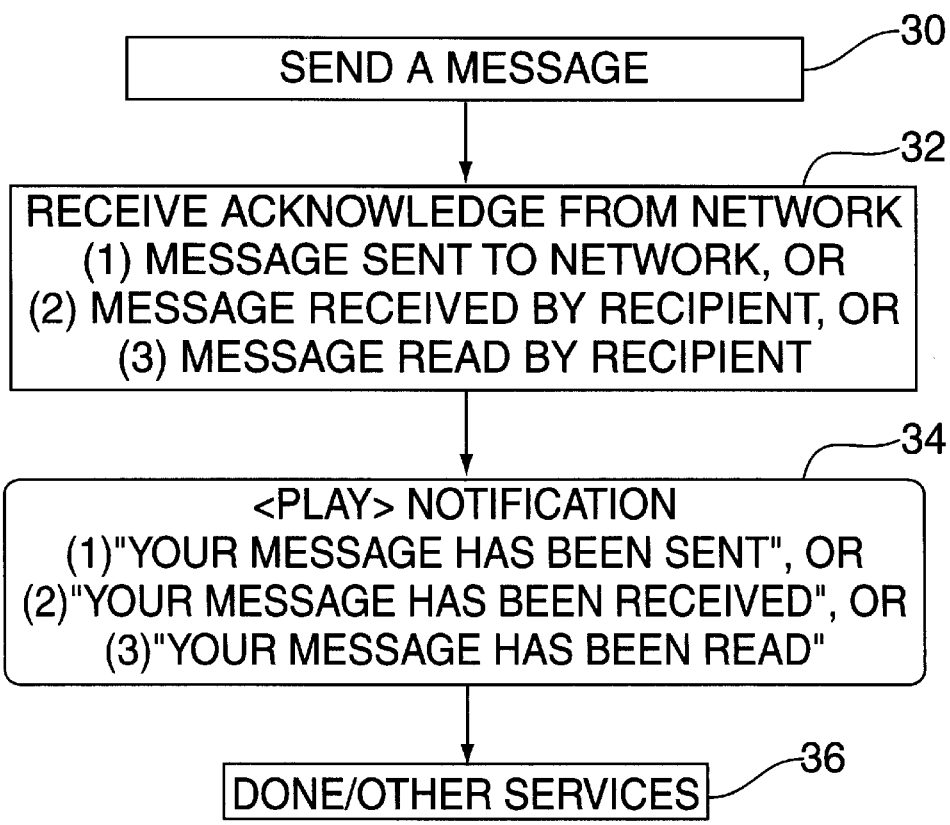
FIG. 3 is a flowchart of the Voice Notification of Message Transmission process used to transmit either a personalized or a default response.

FIG. 3 is the flowchart of Voice Notification of Message Transmission process. This is the point of view of the sender of the message, where the message is sent in operations box 30. In operations box 32, there are numerous acknowledgments received from the network indicating either that the message was sent to the network, or that the message was received by the recipient, or that the message was read by the recipient. Likewise, in operations box 34 a playback is heard by the sender saying "your message has been sent" or "your message has been received" or "your message was read by Bob" for example. Upon successful completion of this process the process takes us to operations box 36 and thus the completion of this process.

Figure 4:
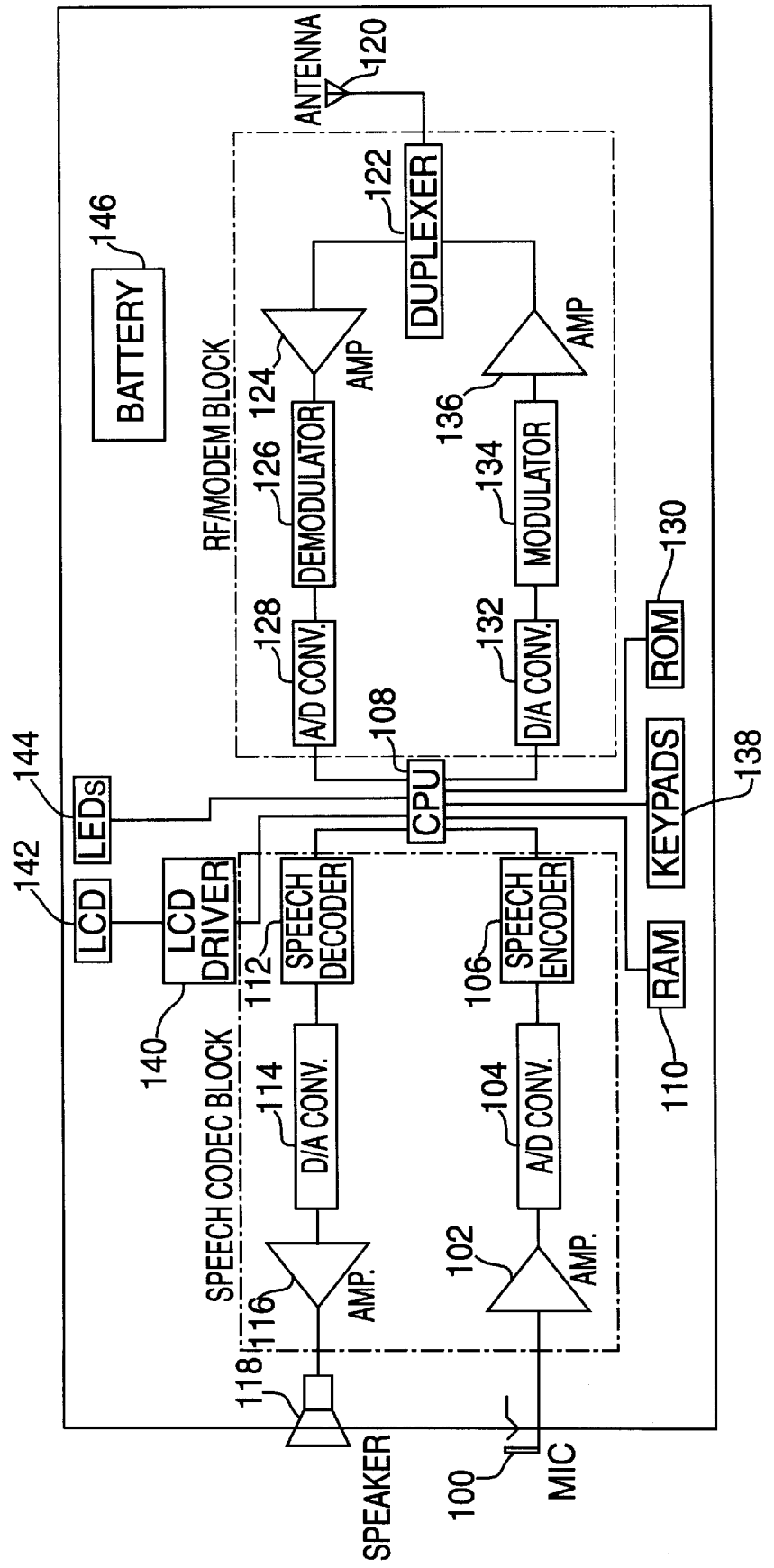
FIG. 4 is a block diagram of the Two Way Messaging Terminal of the present invention.

FIG. 4 is the block diagram of the two way messaging terminal. a microphone is connected to microphone jack 100 so the user can input an audio signal into the messaging terminal. In the preferred embodiment, the microphone is built in. Amplifier 102 amplifies the audio signal and passes it to an analog to digital converter 104 which digitizes the signal. A speech encoder 106 then takes this digital signal and encodes it using any suitable speech encoding algorithm and passes it to the central processing unit 108 which decides where in memory 110 to store the encoded signal. Using the keypad or other input device 138, the user can initiate a playback of a recorded audio signal or to re-record.

When a message arrives at the messaging terminal, it is picked up by the antenna 120. This intercepted signal is passed through a duplexing circuit 122 to a signal amplifier 124. The amplified message is then demodulated by the demodulator circuit 126 and passed to the analog to digital converter 128 to be digitized. This digitized signal is sent to the central processing unit 108 for processing. Upon interpretation of the incoming message, depending on the contents of the message either a default voice prompt, embedded into the read only memory 130, or a user recorded voice prompt stored in the memory 110 is retrieved and passed to the speech decoding circuitry 112. This decoded voice prompt is then converted from digital to analog using the digital to analog converter 114 and is amplified by the amplification circuit 116 and played on the speaker 118.

Upon receiving an incoming message and after the processing and interpretation by the central processing unit 108, light emitting diodes 144, or other display devices, visually indicate the arrival of a message. In addition, data to be displayed is passed by the central processing unit 108 to the liquid crystal display driver 140. This display data is then sent to the liquid crystal display 142 and is viewed by the user of the messaging terminal. Keypad or other input device 138, is used to allow for controlling the various functions of the messaging terminal. The electrical power source for this invention is a battery 146.

Since this invention, in its present embodiment, is a two way messaging terminal, the user can transmit a reply to the incoming message. This is done by user either selecting a response from the various responses previously stored in memory 110 or recording his own. The response is then converted from analog to digital with the aide of the analog to digital converter 132 and is then modulated by the modulating circuit 134. This modulated response is sent to an RF transducer amplifier 136 to be amplified and is then transmitted out of the antenna 120 having first been passed through the duplexing unit 122.

Thus, it is apparent that in accordance with the present invention, an apparatus that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A wireless messaging terminal for receiving an incoming message and for transmitting an outgoing message, said messaging terminal comprising:

a speech processing circuit, comprising:
   an audio input means, for inputting an audio signal;
   a speech amplification circuit, connected to said audio input means for receiving said audio signal at an input and for providing an amplified audio signal therefrom;
   an analog to digital conversion circuit, connected to said speech amplification circuit and receiving said amplified audio signal at an input thereof to produce a digitized audio signal therefrom; and,
   a speech encoding circuit, connected to said analog to digital conversion circuit, said speech encoding circuit receiving said digitized audio signal at an input thereof and providing an encoded signal at an output thereof;

a central processing unit;

a random access memory circuit, connected to said central processing unit for receiving said encoded signal and for storing said encoded signal at a predetermined address, said random access memory circuit also storing a plurality of identification numbers and a plurality of personalized voice messages and customized caller identification signals associated with each one of said plurality of identification numbers, wherein said customized caller identification signals identify the identity of a party to be called;

receiver circuit means for receiving said incoming message including a predetermined identification number, said receiver comprising:

a message amplification circuit, to amplify said received message thus producing an amplified message;

a demodulation circuit, connected to said message amplification circuit and receiving said amplified message at an input thereof and providing a demodulated message at an output thereof; and an analog to digital conversion circuit, connected to said demodulation circuit and receiving said demodulated message at an input thereof thus providing a digitized message at an output thereof;

a read only memory circuit, connected to said central processing unit, for storing pre-recorded voice responses;

a speech decoding circuit, connected to said central processing unit, and receiving said encoded signal at an input thereof and providing a decoded signal at an output thereof;

a digital to analog conversion circuit, connected to said speech decoding circuit receiving said decoded signal at an input thereof and providing an analog signal at an output thereof;

audio amplification circuit, connected to said digital to analog conversion circuit, receiving said analog signal at an input thereof and providing an amplified audio signal at an output thereof;

an audio output means, connected to said audio amplification means, for receiving said amplified audio signal at an input thereof and playing a voice prompt;

a display driver circuit, connected to said central processing unit, for receiving display data from central processing unit at an input thereof and providing processed display data therefrom;

display means, connected to said display driver circuit, said display means receiving processed display data from said display driver circuit at an input thereof thus providing a visual message therefrom;

a user interface, connected to said central processing unit for enabling the user to select a response to said message;

a digital to analog conversion circuit, connected to said central processing unit, receiving said response at an input thereof and providing an analog response at an output thereof;

a modulation circuit, connected to said digital to analog converter receiving said analog response at an input thereof and providing a modulated response at an output thereof; and a response amplifier, connected to said modulation circuit receiving said analog response at an input and providing an amplified response at an output thereof, wherein, when said messaging terminal receives said incoming message, said central processing unit searches said random access memory circuit for said predetermined identification number of said incoming message, retrieving said personalized voice message from said random access memory circuit when said predetermined identification number of said incoming message corresponds to one of said identification numbers stored in said random access memory circuit for playback through said audio amplification circuit and said audio output means as an audible alert signal;

and wherein, when a user of said messaging terminal is searching for one of said plurality of identification numbers stored in said random access memory circuit prior to sending said outgoing message associated with said one identification number, said central processing unit searches said random access memory circuit for said customized caller identification signal associated with said one identification number, and causes the playback of said customized caller identification signal through said audio amplification circuit and said audio output means concomitantly with said search of said random access memory circuit.

2. In a wireless messaging terminal of claim 1, wherein said message is digitized prior to being stored.

3. The wireless messaging terminal of claim 1, wherein said memory means includes a random access memory.

4. The wireless messaging terminal of claim 1, wherein said audio means for playing includes a speaker.

5. A wireless messaging terminal of claim 1, wherein the speech processing means includes a central processing unit.

6. The wireless messaging terminal of claim 1, further comprising a transmitter for sending a reply to said incoming voice message.

7. The wireless messaging terminal of claim 1, wherein said input means include a microphone input.

8. The wireless messaging terminal of claim 7, wherein said speech processing means comprises:

an amplifier for amplifying a signal at said microphone input to produce an amplified output;

an analog to digital converter receiving said amplifier output and converting said amplifier output to a digital signal; and, a speech encoder for encoding said digital signal using a speech encoding algorithm.

9. The wireless messaging terminal of claim 1, wherein said audio means for playing back includes:

a speech decoder for converting said digital signal to a digital bitstream;

a digital to analog converter for converting said digital bitstream to an analog signal;

an amplifier receiving and amplifying said analog signal; and a transducer receiving said amplified analog signal to produce said audible signal.

* * * * *